US008295213B2

(12) United States Patent
Wu et al.

(10) Patent No.: US 8,295,213 B2
(45) Date of Patent: Oct. 23, 2012

(54) METHOD, SYSTEM AND APPARATUS FOR UPLINK SPACE TRANSMISSION OF TDD SYSTEM

(75) Inventors: Qunying Wu, Beijing (CN); Shaohui Sun, Haidian District (CN); Shiqiang Suo, Haidian District (CN)

(73) Assignee: China Academy of Telecommunications Technology, Bejing (CN)

( * ) Notice: Subject to any disclaimer, the term of this patent is extended or adjusted under 35 U.S.C. 154(b) by 312 days.

(21) Appl. No.: 12/677,718

(22) PCT Filed: Sep. 5, 2008

(86) PCT No.: PCT/CN2008/001587
§ 371 (c)(1),
(2), (4) Date: Jul. 15, 2010

(87) PCT Pub. No.: WO2009/033365
PCT Pub. Date: Mar. 19, 2009

(65) Prior Publication Data
US 2010/0278059 A1    Nov. 4, 2010

(30) Foreign Application Priority Data
Sep. 11, 2007 (CN) .......................... 2007 1 0121651

(51) Int. Cl.
*H04J 1/00* (2006.01)
(52) U.S. Cl. ..... 370/280; 370/339; 370/345; 455/67.11; 375/226
(58) Field of Classification Search .................. 370/280, 370/339, 345; 455/67.11; 375/226
See application file for complete search history.

(56) References Cited

U.S. PATENT DOCUMENTS

| 2003/0125040 | A1 | 7/2003 | Walton et al. | |
| 2007/0160029 | A1 | 7/2007 | Luo et al. | |
| 2008/0316935 | A1* | 12/2008 | Bala et al. | 370/252 |
| 2009/0274074 | A1* | 11/2009 | Astely | 370/280 |

FOREIGN PATENT DOCUMENTS

| CN | 1613201 | 5/2005 |
| CN | 1992556 | 7/2007 |
| WO | WO 2006/062994 | 6/2006 |

OTHER PUBLICATIONS

International Search Report, PCT/CN2008/001587, dated Dec. 18, 2008, 2 pages.

* cited by examiner

*Primary Examiner* — Jianye Wu
*Assistant Examiner* — Wanda Z Russell
(74) *Attorney, Agent, or Firm* — Woodard, Emhardt, Moriarty, McNett & Henry LLP

(57) ABSTRACT

A method for uplink transmission based on a time division duplex (TDD) system is provided. In the method, a terminal measures downlink channel state information, estimates the state information of the uplink spatial channel using the channel reciprocity of the TDD system, and selects an uplink spatial pre-coding matrix using the state information of the uplink spatial channel based on a certain criterion, the terminal executes spatial pre-coding using the selected pre-coding matrix, and transmits the data stream to a base station via terminal transmit antennae. A terminal, a base station and a system which are based on the method are also provided. The invention uses the reciprocity of the TDD system channel fully to achieve the maximal channel capacity, thereby optimizes the uplink spatial-transmission.

13 Claims, 2 Drawing Sheets

METHOD, SYSTEM AND APPARATUS FOR UPLINK SPACE TRANSMISSION OF TDD SYSTEM

CROSS-REFERENCE TO RELATED APPLICATIONS

This application is the National Stage of International Application No. PCT/CN2008/001587, filed Sep. 5, 2008, which claims the benefit of Chinese Application No. 200710121651.6, filed Sep. 11, 2007.

TECHNICAL FIELD

The present invention relates to the mobile communication technical field, particularly relates to the uplink spatial transmission technology of the Multiple-Input Multiple-Output (MIMO) system, and more particularly relates to a method of uplink spatial transmission in a time division duplex (TDD) MIMO system and a terminal and a base station for implementing the method.

BACKGROUND ART

Currently, application of the MIMO technology in the wireless network mainly aims at increasing the downlink system capacity with a plurality of data streams aimed at a single terminal, thus, most of the terminals are configured with a plurality of antennae, specifically a plurality of receiving chains to accomplish downlink MIMO reception, while configured with only one transmitting chain. With the developments of technologies and increased requirements, a terminal has a plurality of transmitting chains for uplink data transmission, but the maximal channel capacity cannot be achieved since the traditional transmitting method uses the open-loop technology, such as various transmit diversity methods, antenna selection or spatial multiplexing technologies and does not measure the spatial channel state information.

So-called spatial multiplexing uses a plurality of antennas at the receiving end and the transmitting end to make full use of the multipath components in the spatial propagation, and uses a plurality of data channels, such as MIMO sub-channels, on the same frequency band to transmit signals, thereby make the capacity linearly increased with the increasing of the number of the antennae. The process of uplink transmission of the existing spatial multiplexing technology is as follows: when uplink transmission is performed using the spatial multiplexing technology, the terminal firstly converts the signals to be transmitted into several parallel signal streams by serial-parallel conversion, and simultaneously transmits them using individual antenna on the same frequency band. Due to the multipath propagation, each antenna will produce a different spatial signal at the base station, and the base station distinguishes the individual data streams using signal differences.

In the above transmission process, the multi-antenna technology is only a theoretical method. In practice, the uplink data transmission of the MIMO system is usually performed by the terminal which maps the data streams directly onto each antenna and transmits to the base station.

The shortcoming of the existing art is: the existing method for uplink spatial transmission, no matter using multi-antenna or using single-antenna, does not make full use of the spatial channel state information; therefore, the system cannot achieve a maximal channel capacity.

SUMMARY OF THE INVENTION

In view of this, the principle objectives of the present invention are to provide a method, a system and an apparatus for uplink spatial transmission based on a time division duplex system, enabling the uplink transmission to achieve the maximal channel capacity by measuring the state information of the uplink spatial channel, thereby optimizing the uplink spatial transmission.

In order to achieve the above objectives, this invention presented a technical solution as follows:

A method for uplink spatial transmission based on a time division duplex system includes: A, a terminal receiving common reference symbols transmitted by a base station, measuring downlink spatial channel state information based on the public reference symbols, and estimating uplink spatial channel state information based on the measured downlink spatial channel state information; B, the terminal selecting an uplink spatial pre-coding matrix that maximizes the channel capacity of the system based on the estimated uplink spatial channel state information; C, the terminal executing spatial pre-coding using the selected spatial pre-coding matrix, and transmitting spatially pre-coded data streams to the base station via transmit antennae.

As one embodiment of the present invention, after step C it further comprises: D, the base station demodulating the received data streams, and measuring uplink spatial channel state information based on reference symbols for measuring uplink spatial channel in the data streams; E, the base station calculating channel quality indicator for each radio bearer based on the measured uplink spatial channel state information, and allocating uplink resource based on the calculated channel quality indicator.

In the above embodiment, the terminal selects the uplink spatial pre-coding matrix that maximizes the channel capacity of the system based on the estimated uplink spatial channel state information as follows: the terminal selects the uplink spatial pre-coding matrix based on the estimated uplink spatial channel state information using the maximal channel capacity criterion/maximal signal to interference plus noise ratio criterion.

As one embodiment of the present invention, the data stream includes: spatial pre-coded data symbols and reference symbols for demodulating the data symbols, as well as a reference symbols that are not spatially pre-coded for measuring the uplink channel.

As one embodiment of the present invention, estimating the uplink spatial channel state information based on the measured downlink spatial channel state information is as follows: estimating the uplink spatial channel state information based on channel reciprocity property of the time division duplex system and the measured downlink space channel status information.

The present invention further provides a terminal for accomplishing the uplink space transmission. The terminal includes a signal receiving module, a channel managing module, a spatial pre-coding module and a signal transmitting module, wherein, the signal receiving module is configured for receiving common reference symbols transmitted by a base station, and transmitting the received common reference symbols to the channel managing module; the channel managing module is configured for measuring a downlink spatial channel state information based on the common reference symbols received by the signal receiving module, and estimating uplink spatial channel state information based on measured the downlink spatial channel state information, and then transmitting the state information of the uplink spatial channel to the spatial pre-coding module; the spatial pre-coding module is configured for selecting an uplink spatial pre-coding matrix based on the uplink spatial channel state information estimated by the channel managing module to perform spatial pre-coding, and transmitting spatial pre-coded data streams to the signal transmitting module; the signal transmitting module is configured for transmitting the data streams transmitted from the spatial pre-coding module to the base station via transmitting antennae.

As one embodiment of the present invention, the data stream includes: spatial pre-coded data symbols and reference symbols for demodulating the data symbols, as well as a reference symbols that are not spatially pre-coded for measuring the uplink channel.

As one embodiment of the present invention, the spatial pre-coding module estimates the uplink spatial channel state information based on channel reciprocity property of the time division duplex system, which is the measured downlink spatial channel state information.

The present invention further provides a base station for accomplishing the uplink spatial transmission. The base station includes a signal receiving module, a channel managing module and a data stream demodulating module, wherein, the signal receiving module is configured for receiving data streams transmitted by a terminal, and transmitting the received data streams to the channel managing module and the data stream demodulating module, respectively; the channel managing module is configured for measuring uplink spatial channel state information based on a reference symbols for measuring the uplink channel in the data streams received by the signal receiving module, and calculating channel quality indicator for each radio bearer; the data stream demodulating module is configured for executing coherent demodulation of spatial pre-coded data symbols in the data streams received by the signal receiving module to restore the original data streams.

As one embodiment of the present invention, the base station further includes: a resource allocating module, for allocating uplink resource based on the channel quality indicator calculated by the channel managing module.

As one embodiment of the present invention, the data stream includes: the spatial pre-coded data symbols and reference symbols for demodulating the data symbols, as well as the reference symbols that are not spatially pre-coded for measuring the uplink channel.

The present invention further provides a system for accomplishing the uplink spatial transmission. The system includes a base station and at least one terminal served by the base station. The base station is configured for transmitting common reference symbols to the terminal, and receiving spatial pre-coded data streams transmitted by the terminal; the terminal is configured for receiving the common reference symbols transmitted by the base station to measure downlink spatial channel state information, estimating uplink spatial channel state information based on the measured downlink spatial channel state information, and selecting an uplink spatial pre-coding matrix that maximizes channel capacity of the system based on the estimated uplink spatial channel state information, using the selected spatial pre-coding matrix for the spatial pre-coding, and transmitting the spatially pre-coded data streams to the base station.

As one embodiment of the present invention, the base station is further configured for demodulating the received data streams, measuring the uplink spatial channel state information based on a reference symbols in the data stream for measuring the uplink channel; calculating channel quality indicator for each radio bearer based on the state information of the uplink spatial channel, and allocating uplink resource based on the calculated channel quality indicator.

Among the methods, the terminal and the base station for uplink spatial transmission based on the time division duplex system provided in the present invention, the terminal measures the state information of the downlink spatial channel based on the common reference symbols received from the base station, estimates the state information of the uplink spatial channel based on channel reciprocity property of the TDD system, and then the terminal selects the uplink spatial pre-coding matrix based on a certain criterion, such as maximal channel capacity criterion or maximal signal to interference plus noise ratio (SINR) criterion, to maximize the channel capacity of the MIMO channel by selecting the uplink spatial pre-coding matrix, thereby to optimize the uplink spatial transmission.

DETAILED DESCRIPTION OF THE EMBODIMENTS

Figure 1:
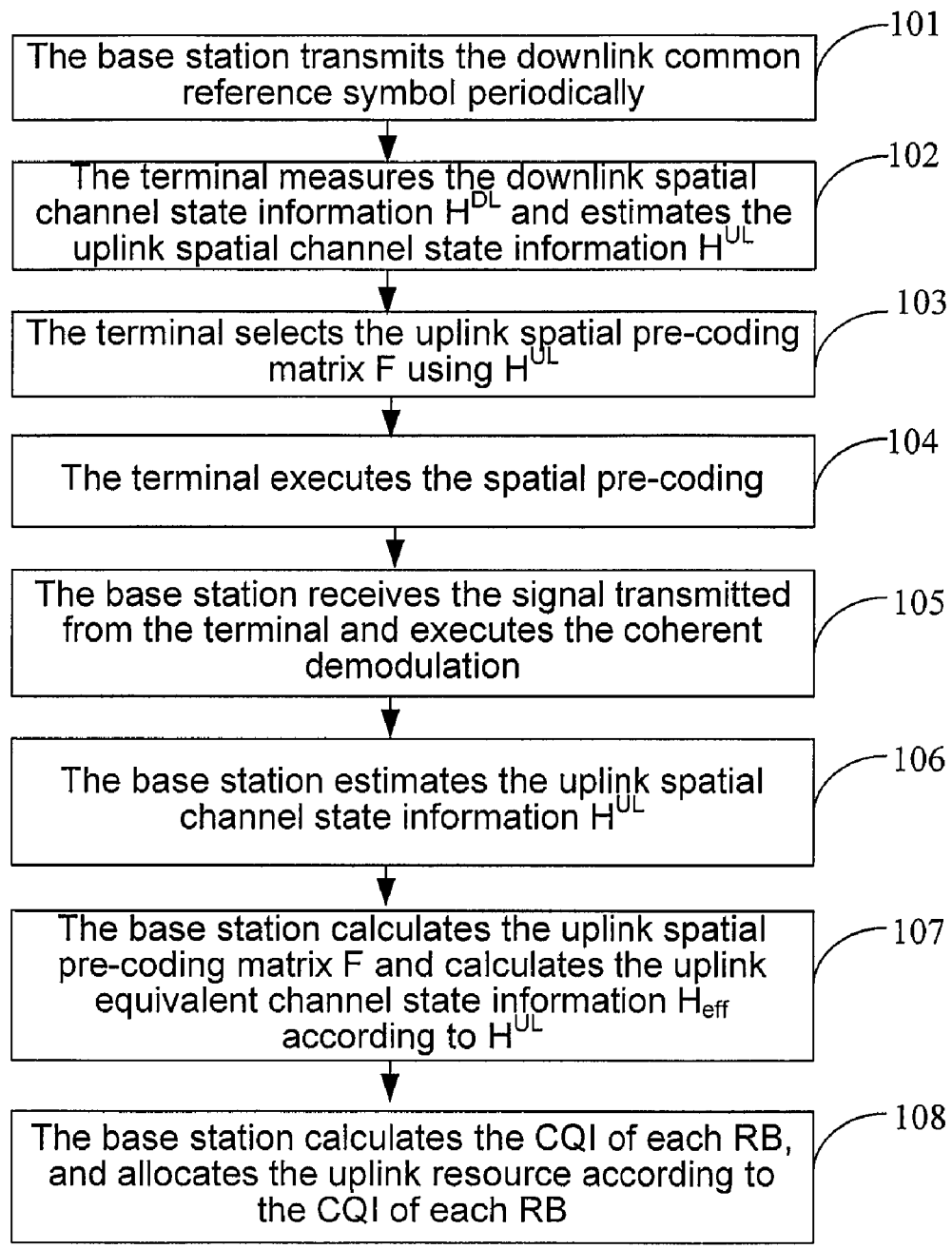
FIG. 1 is a flow chart of a method for uplink spatial transmission based on one embodiment of the present invention.

The essence of the present invention is: the terminal measures the state information of the downlink spatial channel, and obtains the state information of the uplink spatial channel based on the state information of the downlink spatial channel based on channel reciprocity property of the TDD system; then, the terminal selects an uplink spatial pre-coding matrix based on a certain criterion to execute the spatial pre-coding using the selected uplink spatial pre-coding matrix; the base station executes coherent demodulation to the received data streams, and estimates the uplink spatial channel through the reference symbol received for channel measurement.

In order to prove that the system will be enabled to achieve the maximal channel capacity by measuring the spatial channel state information set forth in the present invention, further explanations will be made below with the following specific steps:

Firstly, establishing a MIMO system model, then calculating the channel capacity of the system for the above spatial multiplexing technology and the channel capacity of the system with measurement of the spatial channel state information enabled, and comparing the two values.

Wherein, the so-called MIMO mapping a plurality of data streams to $n_t$ transmitting antennae, a receiving end de-mapping the data arrived at the $n_r$ receiving antennae to output a plurality of data streams, wherein the mapping relations being represented by $\Pi$ and $\Pi^{-1}$. The following is the mapping relations $\Pi$ and $\Pi^{-1}$ of the 2×2 MIMO system, and the system model is:

$$Y = HS + n$$

Wherein, Y and S are 2×1 dimensional, H is 2×2 dimensional, n is 2×1 dimensional received Gaussian white noise, and its variance matrix is $\sigma_n^2 I$. Thereby, when the spatial channel state information measurement is not executed, the MIMO channel capacity is $$C = E_H \left\{ \log \det \left( I + \frac{H R_{CC} H^H}{N_0} \right) \right\}$$

Wherein, $R_{CC}=E\{CC\}$ is the correlation matrix of transmitted signal.

The spatial multiplexing is an open-loop technology, and does not measure the channel state information, so $$R_{CC} = \frac{P}{n_t} I$$

represents transmitting independent data stream with an equal power on each antenna. The channel capacity can be expressed as:

$$C = E\left[ \log \det \left( I_N + \frac{P_T}{N_0 n_t} H H^H \right) \right] = E_\lambda \left[ \sum_{i=1}^{n_{min}} \log \left( 1 + \frac{P_T}{N_0 n_t} \lambda_i^2 \right) \right]$$

Wherein, $\lambda_i$ is eigenvalue of a random channel H.

When measuring the spatial channel state information using a closed loop technology:

Suppose the number of the transmitting antennae are M, the number of the receiving antennae are N, if the dimension of the transmitted symbol vector x is M×1, the dimension of the received symbol vector y is N×1, then, the relation between the transmitted symbol vector x and the received symbol vector y can be represented as:

$$y = Hx + w$$

wherein, H is the spatial channel matrix with a dimension of N×M, w is the received noise vector with a dimension of N×1.

For the known matrix H, $H = U \Lambda V^H$ can be obtained after singular value decomposition, where U is a unitary matrix with a dimension of N×N, V is a unitary matrix with a dimension of M×M; $\Lambda$ matrix is composed of the singular value of the matrix H. Suppose $\lambda_1 \geq \lambda_2 \geq \ldots \lambda_{n_{min}}$ is the eigenvalue of the matrix H, wherein, $n_{min} = \min(M, N)$, then $$\Lambda = \begin{bmatrix} \lambda_1 & 0 & \cdots & 0 & 0 & \cdots & 0 \\ 0 & \lambda_2 & \cdots & 0 & 0 & \cdots & 0 \\ \vdots & \vdots & \ddots & \vdots & \vdots & \ddots & \vdots \\ 0 & 0 & \cdots & \lambda_N & 0 & \cdots & 0 \end{bmatrix} (N < M)$$

$$\Lambda = \begin{bmatrix} \lambda_1 & 0 & \cdots & 0 \\ 0 & \lambda_2 & \cdots & 0 \\ \vdots & \vdots & \ddots & \vdots \\ 0 & 0 & \cdots & \lambda_M \\ 0 & 0 & \cdots & 0 \\ \vdots & \vdots & \ddots & \vdots \\ 0 & 0 & \cdots & 0 \end{bmatrix} (N > M)$$

If $$\tilde{x} := V^H x$$
$$\tilde{y} := U^H y$$
$$\tilde{w} := U^H w$$

then, $y = Hx + w$ can be represented as: i.e.

$$\tilde{y}_i = \lambda_i \tilde{x}_i + \tilde{w}_i, i = 1, 2, \ldots n_{min}$$

It can be seen that, through the singular value decomposition (SVD), the MIMO channel can be converted into $n_{min}$ parallel transmission channels, and each sub-channel has a different receiving Signal-Noise ratio (SNR). If each parallel transmission channel is a Gaussian channel, then the MIMO channel capacity is:

$$C = \sum_{i=1}^{n_{min}} E_{\lambda_i} \left\{ \log \left( 1 + \frac{P_i^* \lambda_i^2}{N_0} \right) \right\} \text{ bits}/s/\text{Hz}$$

Wherein, $P_i^*$ is the power distribution value of each sub-channel. For independently fading Rayleigh channel, the channel is sufficiently random, and it is highly probable that rank of channel full, each eigenvalue under a high SNR has an equivalent power $P^* = P/\min(n_t, n_r)$, and the channel capacity is:

$$C = \sum_{i=1}^{n_{min}} E_{\lambda_i} \left\{ \log \left( 1 + \frac{P \lambda_i^2}{N_0 \min(n_t, n_r)} \right) \right\}$$

In the scenarios of a high Signal-Noise ratio, comparing the closed loop multiplexing with measured spatial channel state information and the open-loop multiplexing where the spatial channel state information is not measured: the degree of freedom is same for both, $\min(n_t, n_r)$, and the system has a power gain $n_t/\min(n_t, n_r)$ when measuring the spatial channel state information over the system where the spatial channel state information is not measured. Therefore, when the number of transmitting antennae $n_t$ is higher than the number of receiving antennae $n_r$, the power gain is $n_t/n_r$. The reason for the power gain is: when measuring the spatial channel state information, the system power is transmitted in various directions of $C^{nt}$, while when the spatial channel state information is not measured, the power is only transmitted in $n_r$ non-zero eigenvalue directions of $C_{nt}$, and it is only $n_r$ subspaces of $C^{nt}$. Therefore, any open-loop technology that does not measure the spatial channel state information cannot obtain a maximal system channel capacity, and thus it is only a suboptimal system.

From the above reasons, it can be seen that by measuring the spatial channel state information, the maximal system channel capacity can be obtained. The present invention will be illustrated in detail with preferred embodiments in the following.

FIG. 1 is a method for uplink spatial transmission based on TDD system based on one embodiment of the present invention. In this embodiment, both the terminal and the base station use multi-antennae for reception and transmission. As shown in FIG. 1, the specific flow of the process comprises the following steps:

Step 101: the base station transmits the downlink common reference symbols that are orthogonal to each other and not pre-coded on a plurality of antennae periodically.

Step 102: the terminal measures the downlink spatial channel state information, and estimates the uplink spatial channel state information based on the measured downlink spatial channel state information.

Herein, based on the received common reference symbols, the terminal measures the downlink spatial channel state information $H^{DL}$ through the method such as the least mean square (LMS) estimation algorithm. When the time interval ΔT between the uplink and the downlink is very short, the vehicular speed of the terminal is not very high, that is, satisfying the condition that the time interval ΔT is smaller than the coherent time of the channel. Since the uplink and downlink channels of the TDD system are reciprocal, the estimation of the uplink spatial channel state information can be obtained:

$$H^{UL} \approx \hat{H}^{UL} = H^{DL}$$

Step 103: the terminal selects the spatial pre-coding matrix based on a certain criterion using the estimated uplink spatial channel state information $H^{UL}$, to maximize the channel capacity of the system.

As one embodiment of the invention, the certain criterion, generally is the maximal channel capacity criterion or the maximal signal to interference plus noise ratio criterion, the two criteria can be optionally selected.

Generally, the expression of the uplink receiver receiving signal is:

$$X = H^{UL}FS + n,$$

Where, n is the noise. Through the step 102, the terminal has obtained the uplink spatial channel state information $H^{UL}$, and can select the spatial pre-coding matrix F based on a certain criterion, such as the maximal channel capacity criterion or the maximal signal to interference plus noise ratio (SINR) criterion, to maximize the channel capacity of the MIMO channel, that is, when the transmitting power is fixed, the mutual information I between the input and the output is the biggest:

$$C = \max_{p(s)} I(X, S)$$
$$Tr(E[SS^*]) = p_0,$$

where, $P_o$ is the total transmitting power.

When the mutual information I is the biggest, the solution of the spatial pre-coding matrix F is:

$$F = V_b$$

Where, $V_b$ is a matrix constructed by b(b≦B) maximal eigen vectors of the eigen vector matrix V of the channel $H^{UL}$.

Step 104: the terminal performs pre-coding of the data based on the selected spatial pre-coding matrix F, and transmits the pre-coded data symbols to the base station via transmitting antennae, and also transmits reference symbols which are not spatially pre-coded for measurement of the uplink channel.

Herein, the spatial pre-coding means: mapping a plurality of parallel data streams S onto $n_t$ transmitting antennae (b≦$n_t$). When executing the spatial pre-coding, each data symbol in the data stream S and the reference symbol required for demodulating the data symbol should be spatially pre-coded. Therefore, the data streams transmitted from the antennae comprise: the spatially pre-coded data symbol and the reference symbol for demodulating the data symbol, as well as the reference symbol that is not spatially pre-coded for measurement of the uplink channel at the base station.

Step 105: after receiving the spatially pre-coded reference symbol required for demodulating the data stream S transmitted by the terminal, the base station estimates the equivalent channel state information $H_{eff}$ by means of the reference symbol for the coherent demodulation to restore b original data streams.

As one embodiment of the invention, the demodulation set forth herein can use various existing algorithms, such as the least mean square error (LMSE) or the data stream serial interference cancellation (SIC).

Step 106: the base station measures the uplink spatial channel state information $H^{UL}$ based on the received reference symbol that is not spatially pre-coded for measuring the uplink channel.

Herein, how to execute measurement belongs to the prior art and will not be described.

Step 107: the base station calculates the uplink spatial pre-coding matrix F for each radio bearer (RB) based on $H^{UL}$.

The base station supposes the spatial transmission matrix at the transmitting end uses the singular value decomposition of the channel matrix $H^{UL}$, and calculates the uplink spatial pre-coding matrix F for each RB.

Step 108: the base station calculates the CQI (channel quality indicator) of each RB based on the equivalent channel state information $H_{eff} = H^{UL}F$, and then allocates the uplink resource based on the CQI of each RB.

In the above steps, steps 101-105 are used to accomplish the uplink spatial transmission of the data from the terminal to the base station; in steps 106-108, the base station obtains the CQI of each RB by measuring the uplink spatial channel state information and through a series of calculations better allocates the uplink resource based on the CQI of each RB, while the allocated uplink resource is used for the uplink spatial transmission next time; steps 101-108 are combined to jointly construct a complete process of uplink spatial transmission.

In order to accomplish the method described in the invention, a system for accomplishing the uplink spatial transmission is further provided. The system includes a base station and at least one terminal served by the base station. The base station is configured for transmitting common reference symbols to the terminal, and receiving spatially pre-coded data streams transmitted by the terminal; the terminal is configured to receiving the common reference symbols transmitted by the base station to measure downlink spatial channel state information, estimating uplink spatial channel state information based on the measured downlink spatial channel state information, and selecting an uplink spatial pre-coding matrix that maximizes channel capacity of the system based on the estimated uplink spatial channel state information, using the selected spatial pre-coding matrix for the spatial pre-coding, and transmitting the spatially pre-coded data streams to the base station.

Figure 2:
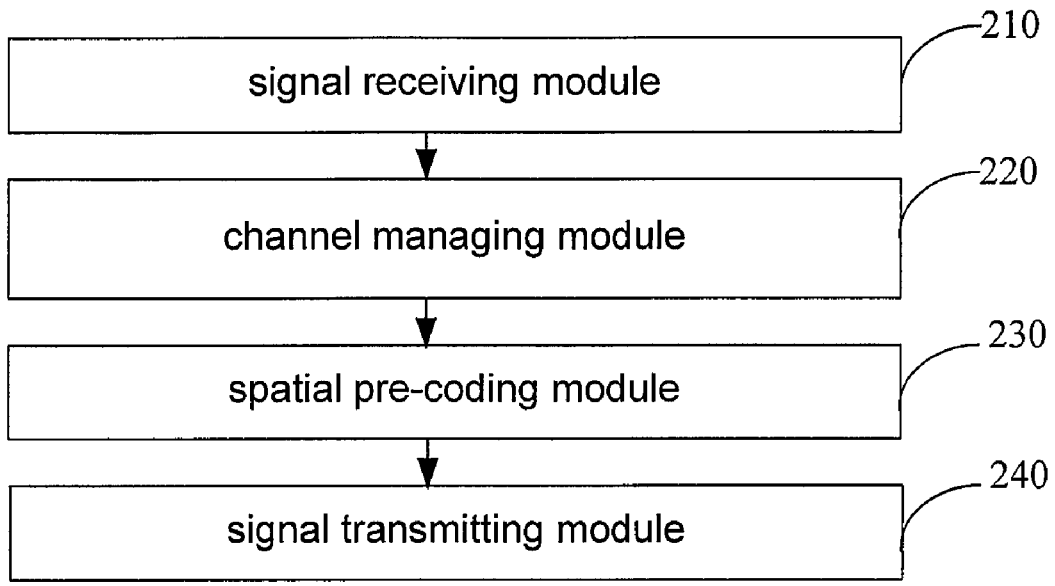
FIG. 2 is a structural scheme of a terminal for uplink spatial transmission based on one embodiment of the present invention.

As one embodiment of this invention, the base station is further configured for demodulating the received data streams, measuring the uplink spatial channel state information based on reference symbols in the data stream for measuring the uplink channel; calculating channel quality indicator for each radio bearer based on the uplink spatial channel state information, and allocating uplink resource based on the calculated channel quality indicator. Wherein, as shown in FIG. 2, it is a structural scheme of the terminal based on the method for uplink spatial transmission of the invention. The terminal includes: a signal receiving module 210, a channel managing module 220, a spatial pre-coding module 230 and a signal transmitting module 240, where:

The signal receiving module 210 is configured for receiving common reference symbols transmitted by the base station, and transmitting the received common reference symbols to the channel managing module 220.

The channel managing module 220 is configured for measuring the downlink spatial channel state information based on the common reference symbols received by the signal receiving module 210, and estimating the uplink spatial channel state information; the channel managing module 220 transmits the estimated uplink spatial channel state information to the spatial pre-coding module 230.

The spatial pre-coding module 230 is configured for selecting an uplink spatial pre-coding matrix based on the uplink spatial channel state information estimated by the channel managing module 220 for the spatial pre-coding, and transmitting the data streams to the signal transmitting module 240. Wherein, the spatial pre-coding module 230 estimates the state information of the uplink spatial channel based on channel reciprocity property of the time division duplex system and the measured downlink spatial channel state information.

Wherein, the data stream includes: spatially pre-coded data symbols and reference symbols for demodulating the data symbol, as well as a reference symbol that is not spatially pre-coded for measuring the uplink channel.

Figure 3:
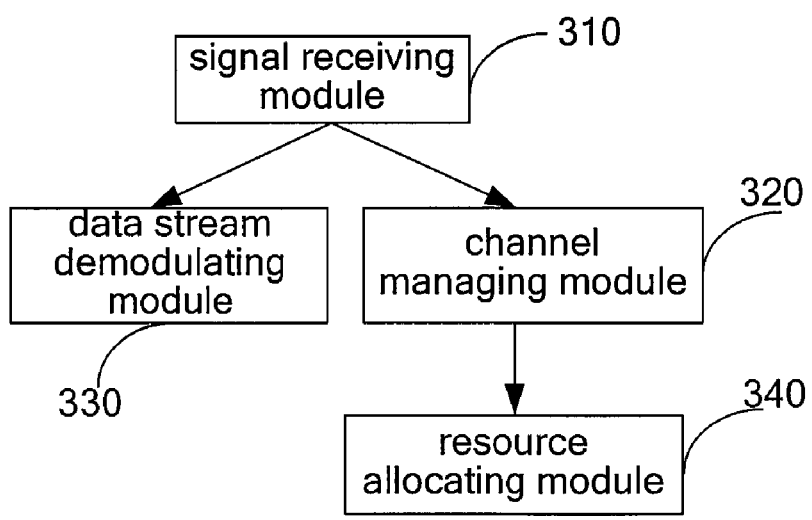
FIG. 3 is a structural scheme of the base station for uplink spatial transmission based on one embodiment of the present invention.

The signal transmitting module 240 is configured for transmitting the data streams transmitted from the spatial pre-coding module 230 to the base station via transmitting antennae. As shown in FIG. 3, it is a structural scheme of the base station based on the method for uplink spatial transmission of the invention. The base station includes: a signal receiving module 310, a channel managing module 320, a data stream demodulating module 330 and a resource allocating module 340, wherein:

The signal receiving module 310 is configured for receiving the data streams transmitted by the terminal, and transmitting the data streams to the channel managing module 320 and the data stream demodulating module 330.

Wherein, the data stream includes: spatially pre-coded data symbols and reference symbols for demodulating the data symbol, as well as reference symbol that is not spatially pre-coded for measuring the uplink channel.

A channel managing module 320 is configured for measuring the uplink spatial channel state information by means of reference symbol that is not spatially pre-coded for measuring the uplink channel in the data stream, calculating the uplink spatial pre-coding matrix, the uplink equivalent channel state information and the channel quality indicator for each radio bearer, and transmitting the calculated channel quality indicator to the resource allocating module 340.

The data stream demodulating module 330 is configured for executing coherent demodulation of the spatially pre-coded data symbol in the data streams received by the signal receiving module 310 to restore the original data streams.

The resource allocating module 340 is configured for allocating the uplink resource based on the channel quality indicator calculated by the channel managing module 320.

In the present invention, the terminal for accomplishing the method for uplink spatial transmission based on the TDD system shown in FIG. 2 and the base station shown in FIG. 3 jointly construct the system for accomplishing the method for uplink spatial transmission based on-the TDD system.

Among the methods, the terminal and the base station for uplink spatial transmission based on the time division duplex system provided in the invention, the terminal measures the state information of the downlink spatial channel based on the common reference symbol received from the base station, and estimates the state information of the uplink spatial channel based on channel reciprocity property of the TDD system, and then the terminal selects the uplink spatial pre-coding matrix based on a certain criterion, such as the maximal channel capacity criterion or the maximal signal to interference plus noise ratio (SINR) criterion, to maximize the channel capacity of the MIMO channel by selecting the uplink spatial pre-coding matrix, thereby to optimize the uplink spatial transmission.

The above description is only some of the selected embodiments of this invention but is not limited to the scope of this invention.

What is claimed is:

1. A method for uplink spatial transmission based on a time division duplex system, comprising:

a terminal receiving common reference symbols transmitted by a base station, measuring downlink spatial channel state information based on the common reference symbols, and estimating uplink spatial channel state information based on the measured downlink spatial channel state information; and the terminal selecting an uplink spatial pre-coding matrix that maximizes channel capacity of the system based on the estimated uplink spatial channel state information; and the terminal executing spatial pre-coding using the selected spatial pre-coding matrix, and transmitting spatially pre-coded data streams to the base station via terminal antennae.

2. The method of claim 1 wherein the method further includes:

the base station demodulating the received data streams, and measuring the uplink spatial channel state information based on reference symbols for measuring uplink spatial channel in the data streams; and the base station calculating a channel quality indicator for each radio bearer based on the measured uplink spatial channel state information, and allocating uplink resources based on the calculated channel quality indicator.

3. The method of claim 1, wherein the uplink spatial pre-coding matrix is selected using maximal channel capacity criterion or maximal Signal-to-Interference-and-Noise Ratio criterion.

4. The method of claim 2, wherein the uplink spatial pre-coding matrix is selected using maximal channel capacity criterion or maximal Signal-to-Interference-and-Noise Ratio criterion.

5. The method of claim 1, wherein the data stream includes: spatially pre-coded data symbols and reference symbols for demodulating the data symbols, as well as reference symbols that are not spatially pre-coded for measuring an uplink channel.

6. The method of claim 1, wherein said estimating is based on channel reciprocity of the time division duplex system and the measured downlink spatial channel state information.

7. A terminal for accomplishing uplink spatial transmission, comprising:

a signal receiving module;
   a channel managing module;
   a spatial pre-coding module; and
   a signal transmitting module;

wherein the signal receiving module is configured for receiving common reference symbols transmitted by a base station, and transmitting the common reference symbols to the channel managing module;

wherein the channel managing module is configured for measuring downlink spatial channel state information based on the common reference symbols received by the signal receiving module, and estimating uplink spatial channel state information based on the downlink spatial channel state information, and then transmitting the uplink spatial channel state information to the spatial pre-coding module;

wherein the spatial pre-coding module is configured for selecting an uplink spatial pre-coding matrix based on the uplink spatial channel state information estimated by the channel managing module to perform spatial pre-coding, and transmitting data streams to the signal transmitting module; and wherein the signal transmitting module is configured for transmitting the data streams from the spatial pre-coding module to the base station via terminal antennae.

8. The terminal of claim 7, wherein the data streams include:
spatially pre-coded data symbols and reference symbols for demodulating the data symbols, as well as reference symbols that are not spatially pre-coded for measuring an uplink channel.

9. The terminal of claim 7, wherein the spatial pre-coding module estimates the uplink spatial channel state information based on channel reciprocity of a time division duplex system and the measured downlink spatial channel state information.

10. A base station for accomplishing uplink spatial transmission, comprising:
a signal receiving module;
a channel managing module; and
a data stream demodulating module;
wherein the signal receiving module is configured for receiving data streams transmitted by a terminal, and transmitting the data streams to the channel managing module and the data stream demodulating module, respectively;

wherein the channel managing module is configured for measuring uplink spatial channel state information based on reference symbols for measuring uplink channel in the data streams received by the signal receiving module, and calculating a channel quality indicator for each radio bearer; and wherein the data stream demodulating module is configured for executing coherent demodulation to spatially pre-coded data symbols in the data streams received by the signal receiving module to restore original data streams.

11. The base station of claim 10, further comprising:
a resource allocating module for allocating uplink resources based on the channel quality indicator.

12. The base station of claim 10, wherein the data streams include:
the spatially pre-coded data symbols and reference symbols for demodulating the data symbols, as well as reference symbols that are not spatially pre-coded for measuring the uplink channel.

13. The base station of claim 11, wherein the data streams include:
the spatially pre-coded data symbols and reference symbols for demodulating the data symbols, as well as reference symbols that are not spatially pre-coded for measuring the uplink channel.

* * * * *